UNITED STATES PATENT OFFICE 2,096,141

INDIGOID VAT DYESTUFFS

Ernst Stoecklin, Binningen, near Basel, and Fritz Grieshaber, Riehen, near Basel, Switzerland, assignors to the firm Society of Chemical Industry in Basle, Basel, Switzerland No Drawing. Application November 30, 1936, Serial No. 113,530. In Switzerland December 17, 1935

2 Claims. (Cl. 260—53)

It has been found that indigoid vat-dyestuffs are obtained by condensing 3-hydroxythionaphthenes of the general formula

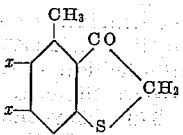

wherein the two $x$'s signify halogen, or their reactive 2-derivatives, with components suitable for making indigoid dyestuffs, or by condensing 3-hydroxynaphthalenes of the general formula

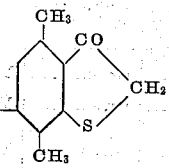

wherein $x$ signifies halogen, or their reactive 2-derivatives, with components suitable for making indigoid dyestuffs, and halogenating the dyestuffs obtained.

3-hydroxythionaphthenes of the foregoing general formula or their reactive 2-derivatives are, for example 4:7-dimethyl-5:6-dichloro-3-hydroxythionaphthene, 4:7-dimethyl-5-bromo-6-chloro-3-hydroxythionaphthene, 4:7-dimethyl-6-chloro-3-hydroxythionaphthene and the 2-(para-dimethyl-amino)-anil of 4:7-dimethyl-6-chloro-3-hydroxythionaphthene.

Components suitable for making indigoid dyestuffs are, for example, 5-membered condensed ring systems, such as isatin, naphthisatin, indoxyl, thionaphthenequinone, hydroxythionaphthene, acenaphthenequinone.

The new dyestuffs are suitable, in particular for dyeing and printing vegetable fibre, for instance cotton, and are characterized by their purity, great covering power and very good properties of fastness. They may be converted into leuco-ester salts by known methods.

The 3-hydroxythionaphthenes of the general formulae given or their reactive 2-derivatives may be made by various methods; for example 4:7-dimethyl-5:6-dichloro-3-hydroxythionaphthene may be produced as follows:—

2:5-dimethyl-3-chloro-1-benzene-sulfochloride, which boils at 132–133° C. under 4 mm. pressure, is made by chlorinating 2:5-dimethyl-1-benzene-sulfochloride by means of chloride in presence of a suitable halogen carrier, such as iodine, antimony trichloride, antimony pentachloride or ferric chloride. This chloro-derivative is reduced in known manner and subsequently condensed with mono-chloracetic acid to produce 2:5-dimethyl-3-chloro-1-phenylthioglycollic acid, which melts at 119–120° C. By treating this thioglycollic acid in, for example, chlorobenzene, with sulfuryl chloride there is obtained 2:5-dimethyl-3:4-dichloro-1-phenylthioglycollic acid, which crystallizes from benzene in colorless needles of melting point 110–111° C. This last-named body is treated with phosphorous trichloride and aluminium chloride or with chlorosulfonic acid to produce 4:7-dimethyl-5:6-dichloro-3-oxythionaphthene. It crystallizes from glacial acetic acid in colorless needles of melting point 227–228° C. The 4:7-dimethyl-6-chloro-3-hydroxythionaphthene of melting point 115° C. is obtained, for example, by treating the above described 2:5-dimethyl-3-chloro-1-phenylthioglycollic acid of melting point 119–120° C. with phosphorous trichloride and aluminium chloride in tetrachlorethane.

From the 3-hydroxythionaphthenes of the aforesaid general formulae, the reactive 2-derivatives, such as the 2-anil, 2-oxime or 2-halide, may be produced in known manner by the action of a nitroso-compound, nitrous acid or halogen respectively, and from the 2-anils the 4:7-dimethyl-5:6-dihalogen- or 4:7-dimethyl-6-halogenthionaphthenequinone is produced by treatment with warm concentrated sulfuric acid.

The following examples illustrate the invention, the parts being by weight:—

Example 1

247 parts of 4:7-dimethyl-5:6-dichloro-3-hydroxythionaphthene and 330.5 parts of 2-(para-dimethylamino)-anil of 4-methyl-6-chloro-3-hydroxythionaphthene are heated together in 4000 parts of boiling benzene, until the condensation is finished. Filtration and drying follow. The new dyestuff of the formula

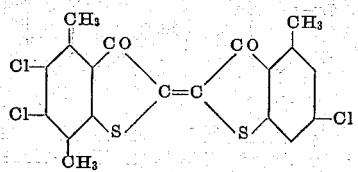

is a red powder, soluble in concentrated sulfuric acid to a green solution and dyeing cotton in a yellow vat vivid rose tints, of very good fastness to washing, chlorine and kier-boiling.

Example 2

247 parts of 4:7-dimethyl-5:6-dichloro-3-hydroxythionaphthene are dissolved in 2000 parts of chlorobenzene and the solution is mixed at 70° C. with a solution of 5:7-dibromisatin chloride made from 305 parts of 5:7-dibromisatine and 250 parts of phosphorous pentachloride in chlorobenzene in known manner. After stirring for a short time the condensation is complete. The dyestuff is filtered, washed with chlorobenzene and alcohol and dried. It is then a dark violet powder of the formula

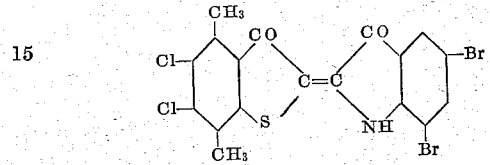

soluble in concentrated sulfuric acid to a green solution and dyeing cotton in a yellow vat fast, full blue-violet tints.

A wholly similar dyestuff is made when in this example 216 parts of 5:7-dichlorisatin are substituted for the 5:7-dibromisatin.

Example 3

212.5 parts of 4:7-dimethyl-6-chloro-3-hydroxythionaphthene are dissolved in 2000 parts of chlorobenzene and the solution is mixed with one of 5:7-dibromisatinchloride, made from 305 parts of 5:7-dibromisatin and 250 parts of phosphorous pentachloride in chlorobenzene in known manner. After stirring for a short time the condensation is complete. Filtration, washing and drying follow. 25 parts of the dyestuff thus obtained are introduced, at 6–10° C., into 900 parts of sulfuric acid of 98 per cent. strength and 9 parts of bromine. The mixture is stirred and the temperature raised gradually to 45–50° C. and kept at this temperature until bromination is complete. The whole is then stirred with ice; the dyestuff of the formula

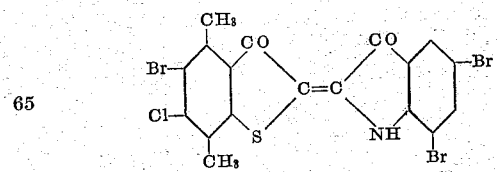

which has separated is filtered, washed with water and dried. It is a blue-violet powder, soluble in concentrated sulfuric acid to a green solution and dyeing cotton in a yellow vat fast, full blue-violet tints.

By substituting 216 parts of 5:7-dichlorisatin for the 5:7-dibromisatin in this example, and using for the subsequent bromination 21 parts of bromine there is obtained a dyestuff of similar properties.

Both dyestuffs also show properties similar to those of the dyestuff obtainable as described in Example 2.

Example 4

212.5 parts of 4:7-dimethyl-6-chloro-3-hydroxythionaphthene and 330.5 parts of 2-(para-dimethylamino)-anil of 5-chloro-7-methyl-3-hydroxythionaphthene are together heated in 4000 parts of boiling alcohol until condensation is complete. Filtration and drying follow. 21 parts of the dyestuff thus obtained are brominated in the manner described in Example 3. The brominated dyestuff of the formula

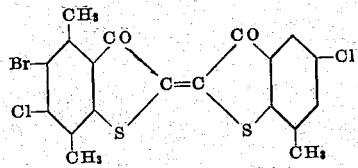

is a violet powder which in its dyeing properties is very similar to the condensation product from 4:7-dimethyl-5:6-dichloro-3-hydroxythionaphthene and the 2-(para-dimethylamino)-anil of 5-chloro-7-methyl-3-hydroxythionaphthene.

In the following table further examples of the dyestuffs obtainable by the invention from 4:7-dimethyl-5:6-dichloro-3-hydroxythionaphthene are given:

| | 4:7-dimethyl-5:6-dichloro-hydroxythionaphthene and: | Color of the dyestuff | Color in concentrated sulfuric acid | Color of the vat | Color of the dyed material |
|---|---|---|---|---|---|
| (1) | 2-(para-dimethylamino-)-anil of 3-hydroxythionaphthene. | Red | Green | Yellow | Red-violet. |
| (2) | 2-(para-dimethylamino-)-anil of 6-chloro-3-hydroxythionaphthene. | Red | Green | Yellow | Red-violet. |
| (3) | 2-(para-dimethylamino-)-anil of 6-ethoxy-3-hydroxythionaphthene. | Red | Green | Yellow | Brick-red. |
| (4) | 2-(para-dimethylamino-)-anil of 5-chloro-7-methyl-3-hydroxythionaphthene. | Violet | Green | Yellow | Violet. |
| (5) | 2-(para-dimethylamino-)-anil of 2:1-naphththioindoxyl. | Bordeaux | Blue-green | Yellow | Bordeaux. |
| (6) | 2-(para-dimethylamino-)-anil of 1-chloro-2:3-naphththioindoxyl. | Blue-violet | Green | Yellow | Blue-violet. |

The dyestuffs of the table have the following composition:—

Dyestuff No. 1

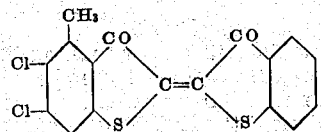

Dyestuff No. 2

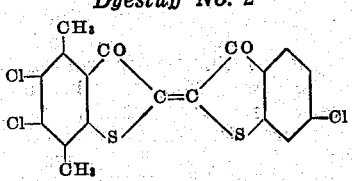

Dyestuff No. 3

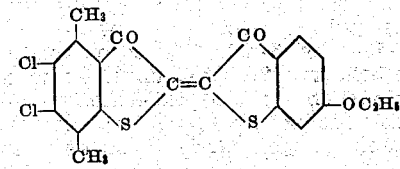

*Dyestuff No. 4*
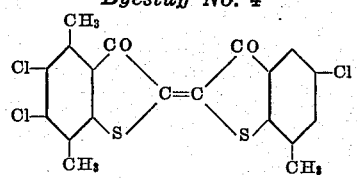
*Dyestuff No. 5*
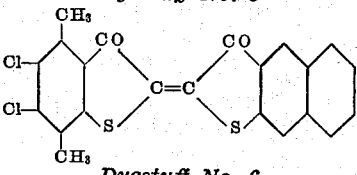
*Dyestuff No. 6*
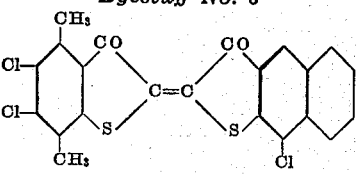
What we claim is:—
1. Indigoid vat dyestuffs of the general formula
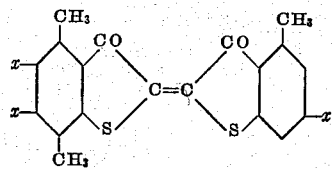
wherein $x$ represents halogen.
2. The indigoid vat dyestuff of the formula
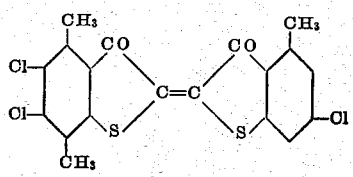
ERNST STOECKLIN.
FRITZ GRIESHABER.